United States Patent Office 3,488,303
Patented Jan. 6, 1970

---

3,488,303
STABILIZATION OF OXYMETHYLENE POLYMERS
Walter E. Heinz, Greenville, S.C., assignor to Celanese Corporation, New York, N.Y., a corporation of Delaware
No Drawing. Filed May 22, 1967, Ser. No. 640,340
Int. Cl. C08g *37/04, 51/56*
U.S. Cl. 260—18                                    7 Claims

ABSTRACT OF THE DISCLOSURE

Oxymethylene polymers are stabilized against thermal degradation by the admixture of a lanthanide metal salt with the polymer. The salt is selected from the group consisting of lanthanide metal salts of non-nitrogenous organic carboxylic acids and alcohols. These novel stabilizers do not cause the odor or discoloration problems attendant with the use of many prior art stabilizers. The system further contains a phenolic antioxidant.

BACKGROUND OF THE INVENTION

This invention relates to oxymethylene polymers. This invention further relates to modified oxymethylene polymers having improved thermal stability.

Oxyalkylene polymers, specifically oxymethylene polymers having recurring —$CH_2O$— units, have been known for many years. They may be prepared by the polymerization of anhydrous formaldehyde or by the polymerization of trioxane, which is a cyclic trimer of formaldehyde. Oxymethylene polymers (both homopolymers and copolymers) vary in physical properties such as thermal stability, molecular weight, molding characteristics, color and the like, depending, in part, upon their method of preparation.

High-molecular-weight oxymethylene polymers have been prepared by polymerizing trioxane in the presence of certain fluoride catalysts. They may also be prepared in high yields and at rapid reaction rates by the use of catalysts comprising boron fluoride coordination complexes with organic compounds, as described in U.S. Patent No. 2,989,506 of Donald E. Hudgin and Frank M. Berardinelli.

Other methods of preparing oxymethylene polymers are disclosed by Kern et al. in Angewandte Chemie, 73 (6), 177–186 (Mar. 21, 1961), and in Sittig, "Polyacetals: What You Should Know," Petroleum Refiner, 41, 11, 131–170 (November 1962), including polymers containing repeating carbon-to-carbon single bonds in the polymer chain and which are made by copolymerizing trioxane with cyclic ethers, e.g., dioxane, lactones, e.g., beta-propiolactone, anhydrides, e.g., cyclic adipic anhydride, and ethylenically unsaturated compounds, e.g., styrene, vinyl acetate, vinyl methyl ketone, acrolein, etc.

Also contemplated in the production of modified oxyalkylene, specifically oxymethylene, polymeric compositions of the instant invention are oxymethylene polymers the end groups of which are reacted or "capped" with, for example, a carboxylic acid or a monomeric ether. Typical capping agents are alkanoic acids (e.g., acetic acid), which form ester end groups, and dialkyl ethers (e.g., dimethyl ether), which form ether end groups.

Still other oxymethylene polymers, more particularly copolymers, which are adapted for use in producing the modified oxymethylene polymers of this invention are those which are prepared as described in U.S. Patent No. 3,027,352 of Walling et al. by copolymerizing, for example, trioxane with any of various cyclic ethers having at least two adjacent carbon atoms, e.g., ethylene oxide, dioxolane, and the like.

One problem associated with the use of such oxymethylene polymers is their vulnerability to attack by acids, especially at elevated temperatures, for example during molding operations when the polymer may be heated to temperatures of about 200° C. or higher. At such elevated temperatures, formaldehyde which is inherently present in the polymer is normally oxidized to formic acid. The acid attacks the oxymethylene chain so as to split or cut the chain into two segments, which are then quite susceptible to further degradation by heat alone.

In order to prevent or minimize the initial acid attack certain stabilizers or inhibitors have been added to the polymer. For example, antioxidants such as bisphenols have been added to prevent the conversion of formaldehyde to formic acid. Inevitably, however, some formic acid will form; therefore, various nitrogen-containing stabilizers, e.g., polyamides, poly(vinylpyrrolidone), the various acrylamide copolymers, melamine, cyanoguanidine, nitrilotrispropionamide and the like have been added in order to neutralize the acid that does form. These nitrogen-containing stabilizers or so-called chain-scission inhibitors, however, have been found to cause an amine-like or fishy odor, which is quite undesirable when using the polymer as a container for packaging consumer goods.

Alkali and alkaline earth metal salts have also been suggested for use as thermal stabilizers or chain-scission inhibitors in oxymethylene polymer compositions. Unfortunately, while these metal salts eliminate the odor problem caused by the nitrogen-containing stabilizers, it has been found that these alkali and alkaline earth metal salts cause discoloration of the oxymethylene polymer in varying, but frequently noticeable degrees.

SUMMARY OF THE INVENTION

Accordingly, the primary object of the present invention is to provide an improved thermal stabilizer or chain-scission inhibitor for use with oxymethylene polymers so as to essentially prevent or alleviate the problems of odor and discoloration mentioned above.

Other and further objects of the present invention will be apparent to those skilled in the art from the following more detailed description.

The objects of the present invention are attained by preparing a composition comprising a substantially homogeneous admixture of a normally solid, oxymethylene polymer and at least one lanthanide salt selected from the group consisting of (i) lanthanide metal salts of non-nitrogenous organic acids having from 2 through 30 carbon atoms and at least one

group, and
(ii) lanthanide metal salts of non-nitrogenous alcohols having from 2 through 30 carbon atoms.

It has been found that the aforesaid lanthanide metal salts are not only effective oxymethylene polymer chain-scission inhibitors (formic acid acceptors), but they do not cause the odor or discoloration prblems attendant with the use of many of the prior art chain-scission stabilizers.

THE OXYMETHYLENE POLYMER

The oxymethylene polymer that is modified in practicing this invention may be, as previously has been indicated, homopolymeric oxymethylene or an oxymethylene copolymer. The two are not the full equivalent of each other as the main or primary component in the stabilized polymeric composition of this invention. The preferred primary component is a copolymer of oxymethylene.

The oxymethylene polymers useful in this invention may be prepared as broadly and more specifically described in the fourth through the eight paragraphs of this specification and in the citations therein given. An oxymethylene copolymer of the kind disclosed and claimed in the aforementioned Walling et al. patent is especially suitable for use as the copolymer that is modified in producing the stabilized polymeric compositions with which this invention is concerned.

Thus, the oxymethylene copolymer used in carrying this invention into effect may be a polymer having a structure comprising recurring units represented by the general formula (I) 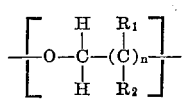

wherein each $R_1$ and $R_2$ is selected from the group consisting of hydrogen, lower alkyl and halogen-substituted lower alkyl radicals, and wherein $n$ is an integer from zero to four, inclusive, and $n$ being zero in from 85% to 99.9% of the recurring units. The oxymethylene copolymer may be defined more specifically as a normally solid, substantially water-insoluble copolymer, the repeating units of which consist essentially of (A) —$OCH_2$— groups interspersed with (B) groups represented by the general formula (II) 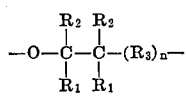

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three inclusive. Each lower alkyl radical preferably has from one to two carbon atoms, inclusive. The —$OCH_2$— units of (A) constitute from 85% to 99.9% of the recurring units. The units of (B) are incorporated into the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 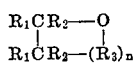

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive.

The preferred cyclic ethers used in the preparation of the oxymethylene copolymers are ethylene oxide and 1,3-dioxolane, which may be represented by the formula (IV) 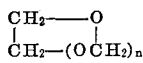

wherein $n$ represents an integer from zero to two, inclusive. Other cyclic ethers that may be employed are 1,4-dioxane, trimethylene oxide, tetramethylene oxide, pentamethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences, with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to from 0.1 mole percent to about 40 mole percent of —OR— groups, and more particularly from 60:99.6 (e.g., 70:99.6) mole percent of the former to 0.4:40 (e.g., 0.4:30) mole percent of the latter. As indicated hereinbefore, the most preferred copolymers are those having from about 85 mole percent to 99.6–99.9 mole percent of recurring oxymethylene groups and from 0.1–0.4 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented in the general formula (V) 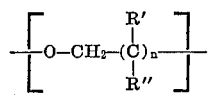

wherein $n$ represents an integer from 0 to 4, inclusive, and representing 0 (zero) in from 60 to 99.6 mole percent of the recurring units; and $R'$ and $R''$ represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 e.g., from 60 or 70 to 99.6 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI) 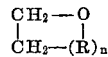

wherein $n$ represents an integer from zero to 3, inclusive, and R represents a divalent radical selected from the group consisting of (a) $CH_2$, (b) $CH_2O$, and (c) any combination of $CH_2$ and $CH_2O$.

Examples of specific cyclic ethers embraced by Formula VI that may be used in the present invention, and of acetals and cyclic esters that may be employed instead of cyclic ethers, are 1,3 - dioxane, 1,3,5 - trioxepane, beta-propiolactone, gamma-butyrolactone, neopentyl formal, penta-erythritol diformal, paraldehyde, tetrahydrofuran and butadiene monoxide. In addition, glycols including for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety, it will be understood, of course, by those skilled in the art that instead of formaldehyde other sources of the oxymethylene moiety may be used, e.g., paraformaldehyde, trioxane, acetaldehyde, propionaldehyde, acetone, and the like. One may also employ cyclic acetals, e.g. 1,3,5 - trioxepane, in lieu of both the cyclic ether and formaldehyde.

The term "oxymethylene" as used in the specification and claims of this application, unless it is clear from the context that a more specific meaning is intended, includes substituted oxymethylene, wherein the substituents are inert with respect to the reactions in question; that is, the substituents are free from any interfering functional group or groups that would ceause or result in the occurrence of undesirable reactions.

Also, as used in the specification and claims of this application, the term "copolymer" means polymers obtained by copolymerization of two or more different monomers (i.e., polymers containing in their molecular structure two or more different monomer units), and includes terpolymers, tetra-polymers and higher multi-component polymers. The term "polymer" (unless it is clear from the context that the homopolymer or a copolymer is intended) includes within its meaning both homopolymers and copolymers.

The oxymethylene polymers that are modified to produce the compositions of this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene polymer component of the compositions of this invention may be, if desired, oxymethylene polymers that have been preliminarily stabilized to a substantial degree, prior to admixture with stabilizing additive (including a particular kind of metal salt), to produce the compositions of this invention. Such stabilizing technique may take the form of stabilization by degradation of the molecular ends of the polymer chain to a point where a relatively stable carbon-to-carbon linkage exists at each end.

Catalysts suitable for use in polymerizing trioxane or formaldehyde alone or with other copolymerizable components in producing the oxymethylene polymers that are modified to produce the thermally stabilized polymer compositions of this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, and compounds containing these materials, such as boron fluoride coordinate complexes with organic compounds, particularly those in which oxygen or sulfur is a donor atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials, such as boron fluoride monohydrate, boron fluoride dihydrate and boron fluoride trihydrate as well as boron fluoride coordinate complexes with organic compounds as mentioned previously.

As indicated earlier in this specification, it is also within the purview of this invention to utilize oxymethylene polymers, including homopolymers of trioxane or of formaldehyde, the molecules of which have been "end capped" by known methods of etherification or esterification.

THE STABILIZING ADDITIVE

The lanthanide metal salts which may be blended with the aforesaid oxymethylene polymers to form the improved compositions of this invention are lanthanide metal salts of non-nitrogenous organic acids having from 2 through 30 carbon atoms, at least one

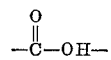

group, and preferably contain at least one primary, secondary or tertiary alcoholic hydroxyl group. In addition, lanthanide metal salts of non-nitrogenous alcohols (primary, secondary or tertiary alcohols) having from 2 through 30 carbon atoms, sometimes hereinafter referred to as alcoholates, may also be used.

The lanthanide metals or cations of the above salts include those metals of atomic number 57 through 71, such as lanthanum, cerium, praseodymium, neodymium, promethium, samarium, europium, gadolinium, terbium, dysprosium, holmium, erbium, thulium, ytterbium and lutetium.

The lanthanide salt component of the stabilized polymer composition may be one or more salts of the aforementioned non-nitrogenous organic acids and/or one or more salts of the aforesaid non-nitrogenous alcohols. The organic acid may be monobasic or polybasic, saturated or unsaturated, branched-chain or straight-chain, and substituted or unsubstituted provided that any substituent or substituents are inert during formulation; that is, are free from any interfering functional group or groups that would cause or result in the occurrence of undesirable side reactions. For example, —OH— groups are permissible substituents; and, in fact, the available evidence indicates that they are desirable. Or, the substituent may be, for instance an —OR— group where R represents an alkyl radical such as a lower alkyl radical, specifically a $C_1$ through $C_5$ alkyl radical.

Illustrative examples of non-nitrogenous organic acids that may be employed in producing the aforementioned metal salts are the unsubstituted, straight-chain, saturated, aliphatic, monocarboxylic acids having from 2 through 30 carbon atoms, viz., ethanoic, propanoic, butanoic and higher members of the homologous series through triacontanoic (melisaic),

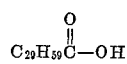

the corresponding branched-chain, saturated, aliphatic, monocarboxylic acids, e.g., alphamethylbutyric (2-methylbutanoic), isovaloric (3 - methylbutanoic), pivalic (2,2-dimethylpropanoic) and 2-ethylhexoic (octoic); the monoethylenically unsaturated, aliphatic, monocarboxylic acids having up to and including about 30 carbon atoms, e.g., 4 decenoic, caproleic, 10-undecenoic, lauroleic, 5-tetradecenoic, myristoleic, palmitoleic, cis-6-octadecenoic, trans-6-octadecenoic, oleic, elaidic, trans-11 - octadecenoic, cis-9-eicosenoic, 11 docosenoic, erucic, brassidic, cis-15-tetracosenoic, and 17-hexacosenoic.

Still other examples of useful non-nitrogenous organic acids that may be employed in making the lanthanide salts are the di-, tri- and higher polyethylenically unsaturated aliphatic, monocarboxylic acids having up to and including about 30 carbon atoms, e.g., sorbic, linoleic, linolelaidic, hiragonic, α - eleostearic, β - eleostearic, punicic, linolenic, elaidolinolenic, pseudoeleostearic, moroctic, α-parinaric, β-parinaric, arachidonic, clupanodonic and nisinic.

As indicated hereinbefore, lanthanide salts of hydroxy-substituted carboxylic acids having up to and including 30 carbon atoms are particularly suitable for use in practicing this invention, for example, the lanthanide ricinoleates, and especially cerium ricinoleate.

Ricinoleic acid,

is therefore the preferred hydroxy-substituted carboxylic acid, the lanthanide salt of which is especially valuable in carrying the instant invention into effect. Additional specific examples of other acids of this same sub-group that similarly may be employed are alpha - hydroxydecanoic, 3-hydroxydecanoic acid having the formula

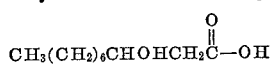

12 - hydroxydodecanoic (sabinic), 16 - hydroxyhexadecanoic (juniperic), 10-hydroxyhexadecanoic, 12 - hydroxyoctadecanoic, 10 - hydroxy - 8 - octadecenoic, DL-erythro-9, 10 - dihydroxyoctadecanoic and lanoceric acids.

Illustrative examples of other substituted non-nitrogenous organic acids, the lanthanide salts of which may be employed in practicing this invention, are the various keto-substituted aliphatic monocarboxylic acids, e.g., pyruvic, acetoacetic, 4-oxooctadecanoic, 6 - oxooctadecanoic, 10-oxooctadecanoic, 17-oxooctadecanoic, 13-oxodotriacontanoic, 13-oxohexatetracontanoic, alpha-licanic, 6,7-dioxooctadecanoic and 9,10-dioxooctadecanoic acids.

Examples of still other monocarboxylic acids that may be used in making the lanthanide salts are the various hydroxy-substituted toluic acids including 2- and 3-paratoluic acids, etc.; the aryl-substituted aliphatic monocarboxylic acids, e.g., phenylacetic (alpha-toluic) acid, etc.; dihydroxy monocarboxylic acids, e.g., glyceric acid; and others up to 30 carbon atoms (preferably up to not more than about 20 carbon atoms), that will be apparent to those skilled in the art from the foregoing illustrative examples.

Instead of using lanthanide salts of monobasic acids, one may employ lanthanide salts of di-, tri- and higher polybasic acids. Examples of such acids are the saturated dicarboxylic acids having from 2 through 30 carbon atoms, including oxalic, malonic, succinic, glutaric, adipic, pimelic, suberic, sebacic, azelaic and higher members of the homologous series up to and including about 30 carbon atoms; tricarballylic and other higher polycarboxylic acids; ethylenically unsaturated polybasic acids, e.g., fumaric, maleic, itaconic, citraconic, mesaconic and aconitic acids; aromatic polycarboxylic acids, e.g., phthalic, terephthalic, isophthalic and chlorophthalic acids; and the various hydroxy-substituted polycarboxylic acids, e.g., citric, tartronic, malic, tartaric, dihydroxy-succinic, saccharic, mucic, etc.; as well as other acids having from 2 up to about 30 carbon atoms that will be apparent to the skilled chemist from these illustrative examples.

Illustrative examples of non-nitrogenous alcohols of which the lanthanide salts or alcoholates can be made and used in practicing this invention are those alcohols which are free from a carboxyl

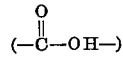

group or groups, but otherwise correspond to the carboxylic acids hereinbefore given by way of illustration. Among such alcohols may be mentioned the straight-chain and branched-chain, saturated, monohydric alcohols, such as ethanol and the normal and isomeric forms of propanol through triacontanol; and the mono-, di- and higher polyethylenically unsaturated monohydric alcohols corresponding to the aforementioned saturated monohydric alcohols including, for example, allyl, methallyl, crotyl, cinnamyl, alpha-phenylallyl, 3-buten-2-ol, 1-penten-3 - ol, 3-penten-2-ol, 4-penten-1-ol, 4-penten-2-ol, 3 - ethyl - 5-hexen-3-ol and higher members of the homologous series.

Still other examples include the non-nitrogenous alcohol-ethers, e.g., the monoethyl, -butyl, -phenyl, and -benzyl ethers of ethylene glycol and of diethylene glycol, propylene glycol monomethyl ether, pentylene glycol monoethyl ether, decyclene glycol monophenyl ether and dibutylene glycol monobutyl ether.

Other specific examples include the various non-nitrogenous polyhydric alcohols containing up to about 30 carbon atoms, e.g., ethylene glycol, diethylene glycol, triethylene glycol, tetraethylene glycol, hexamethylene glycol, decamethylene glycol, 2-ethyl-1,3-hexanediol, 1,3-butylene glycol, pentaethylene glycol, heptaethylene glycol, octaethylene glycol, decaethylene glycol, 2-butyl-1,3-octanediol, 2-ethyl-2-methylol-1-hexanol, 6 - methyl - 2,4-heptanediol, glycerol, erythritol, pentaerythritol, dipentaerythritol, adonitol, xylitol, arabitol, mannitol, dulcitol, sorbitol, trimethylol-propane, cocceryl alcohol, and others that will be apparent to those skilled in the art from the foregoing illustrative examples.

The use of lanthanide salts of non-nitrogenous ethynoid (acetylenically unsaturated) aliphatic carboxylic acids and lanthanide salts of ethynoid alcohols, which salts are available or can be prepared, is not precluded in producing the stabilized oxymethylene polymer compositions of this invention. Also within the scope of this invention is the use of the lanthanide salts of alicyclic (e.g., naphthenic) compounds containing at least one carboxylic acid group and/or at least one alcoholic hydroxyl group.

The kind and amount of stabilizing additive which is incorporated in the oxymethylene polymer has been functionally described hereinbefore, and it has been pointed out that it comprises at least one member of the group consisting of the aforementioned lanthanide salts of non-nitrogenous organic acids and lanthanide salts of non-nitrogenous alcohols. More particularly it may be stated that the lanthanide salt component of the stabilizing additive is a small, positive, stabilizing amount up to about 5 percent by weight of the oxymethylene polymer, e.g., from 0.001 to 5 percent, and still more particularly 0.01 to 3 percent by weight of the polymer. The preferred amount of the lanthanide component is a stabilizing amount from 0.01 up to 1.5 percent by weight of the oxymethylene polymer. Higher amounts, such as percentages of the order of 3 to 5 weight percent of the polymer, may sometimes be necessary or desirable in stabilizing pigmented oxymethylene polymer concentrates, the amount varying depending upon, for example, the acidic characteristics of the particular pigment employed.

In addition to the above chain-scission inhibitors other stabilizing additives are preferably admixed with the oxymethylene polymer, for example, an antioxidant ingredient such as a phenolic antioxidant. Useful antioxidants are the various substituted bisphenols and, more particularly the alkylene bisphenols, including compounds having from 1 to 4 carbon atoms in the alkylene grouping and from zero to two alkyl substituents on each benzene ring, each of the alkyl substituents containing from 1 to 4 carbon atoms. The preferred alkylene bisphenols are 2,2'-methylene bis(4-methyl-6-tertiary-butylphenol) and 4,4'-butylidene bis(3-methyl-6-tertiary-butylphenol). Suitable phenolic antioxidants other than the alkylene bisphenols include 2,6-di-(tertiary-butyl)-4-methylphenol, p-phenylphenol and octylphenol.

The amount of the phenolic antioxidant, e.g., an alkylene bisphenol, which is employed is usually not more than about 5 weight percent, more particularly from 0.05 to about 2.0 weight percent, based on the weight of the oxymethylene polymer. A preferred range of phenolic antioxidant is from about 0.1 to about 1.0%, still more preferably from 0.3 to 1.0%, by weight of the polymeric oxymethylene.

The stabilized polymeric compositions of this invention are prepared by admixing the ingredients thereof in any suitable manner whereby a substantially homogeneous composition is obtained. For example, the stabilizing additive comprised of the above-described lanthanide salt component and/or antioxidant ingredient may be incorporated into the oxymethylene polymer by dissolving both the polymer and the stabilizer additive component(s) in a common solvent, and thereafter evaporating the solution to dryness. Alternatively, the stabilizer-additive component(s) may be incorporated into the polymer by applying a solution of the thermal stabilizer to finely divided polymer, as in a slurry, and thereafter filtering the polymer and evaporating it to dryness.

Another suitable method of admixing the components of the composition, especially when the stabilizer additive is a dry solid, is to blend said additive into the plastic polymer while the latter is being kneaded, e.g., on heated rolls or during passage through screw-type or other type of mixer-extruder apparatus. Or, when the stabilizer additive is a finely divided solid, it may be blended with the finely divided polymer in any suitable blending apparatus until a sustantially homogeneous composition results.

The thermally stabilized compositions of this invention may also include, if desired, plasticizers, fillers, pigments, or other stabilizers such as those which are stabilizers against degradation by ultraviolet (U.V.) light. Thus, the oxymethylene polymer may be stabilized against such light degradation by incorporating therein a U.V. light-stabilizing amount of a 2-hydroxybenzophenone, e.g., about 1% by weight of 2,2'-dihydroxy-4,4'-dimethoxybenzophenone.

The modified oxymethylene polymer compositions obtained by practicing the present invention are characterized by exhibiting a greater degree of thermal stability than do the corresponding unmodified compositions, and more particularly, those compositions which contain no non-nitrogenous lanthanide salts (chain-scission inhibitors) of the kind used in practicing this invention, but which are otherwise the same. For example, an unmodified oxymethylene copolmer usually has a degradation rate ($K_d$) over the first 45 minutes of heating at 230° C. greater than 1 weight percent/minute (or even greater than 3 weight percent/minute with some copolymers, and even higher than this latter value in the case of homopolymers). In marked contrast, the modified oxymethylene polymer compositions of the present invention will usually have a $K_d$ value, when heated as briefly described in the preceding sentence, of less than 0.1 weight percent/minute. Frequently lower values will be obtained with a particular concentration of a preferred lanthanide salt, viz., a lanthanide salt of an aliphatic carboxylic acid having an alcoholic hydoxyl substituent in the aliphatic chain, and by which is meant specifically cerium ricinoleate.

(Parenthetically it may here be mentioned that the heating of the polymer mentioned in the preceding paragraph, and in the example that follows with reference to a determination of $K_d$ value, is carried out at 230° C. in a circulating air oven in which the samples are maintained in open dishes on a turntable rotating at 3 r.p.m. and in which the samples may be weighed without removal from the oven.)

The stabilizing additive employed in practicing this invention is preferably a normal or full lanthanide salt of the defined non-nitrogenous organic acid or alcohol. However, the use of partial salts also is contemplated, that is, lanthanide salts of the defined acids and alcohols wherein only part (e.g., ½, ⅓, ⅔, ¼, ¾, etc.) of the total carboxylic and/or alcoholic groups of the acid, alcohol or acid-alcohol have been reacted to form a salt thereof. When such partial salts are used, then ordinarily a larger amount of stabilizing additive is required in order to attain the same degree of thermal stabilization.

The present invention is further illustrated by the following example wherein all parts and percentages are by weight unless otherwise stated.

EXAMPLE

The oxymethylene polymer (acetal polymer) used in this example is a trioxane-ethylene oxide copolymer containing about 2 weight percent (about 1 mole percent) of monomeric units derived from ethylene oxide. It is prepared as previously has been broadly described herein and more specifically in the cited art, e.g., the aforementioned Walling et al. Patent No. 3,027,352. It is in flake form, and about 70% of the copolymer passes through a 40-mesh screen. It has an inherent viscosity (I.V.) of about 1.2 (measured at 60° C. in 0.1 weight percent solution in p-chlorophenol containing 2 weight percent of alphapinene). It has a melt index of about 9.0. (The apparatus used and method of determining melt index are described in ASTM D–1238–57T.)

Two compositions, A and B, are prepared, differing only in the concentration of the non-nitrogenous thermal stabilizer employed, viz., cerium ricinoleate (CeR). Composition A is prepared in proportions such that there is admixed with the copolymer 0.1% by weight thereof of CeR and 0.5% by weight of the copolymer, of a phenolic antioxidant, specifically 2,2'-methylene bis(4-methyl-6-tertiary-butylphenol). Composition B differs only in that it contains 0.2% instead of 0.1% CeR based on the weight of the oxymethylene copolymer.

The individual compositions may be prepared by thoroughly admixing together the flake polymer and modifying components by tumbling the constituents in a blending unit, more particularly a Henshel blending unit, for 30 minutes at 30 r.p.m. The dry substantially homogeneous admixture of the components may then be extruded through a 1¾" extruder using a melt temperature between about 380° F. and 420° F., and a die temperature of 410° F. The extruder material is then made into small pellets, about ⅛" x ⅛" in average size.

Samples of pellets of both compositions are tested for their degradation rate in air at 230° C. using the procedure that previously has been described. The results would be as follows:

|   | $K_d$(wt. percent/min.) |
|---|---|
| Composition A | <0.1 |
| Composition B | <0.1 |

In marked contrast, when the unstabilized copolymer is similarly processed and tested, it shows a $K_d$ value of greater than 1 wt. percent/minute.

In addition to the above described thermal-stability improvement that is characteristic of the modified oxymethylene polymers of this invention as compared with the unmodified polymers, a further plus factor is that these results are obtained without imparting to the composition the aforementioned amine-like or fishy odor and discoloration that usually results upon heating prior art compositions containing nitrogen-containing and alkali/alkaline earth salt stabilizers, respectively.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. An oxymethylene polymer composition comprising:
   (A) an oxymethylene polymer,
   (B) an oxymethylene polymer phenolic antioxidant, and
   (C) a stabilizing amount of at least one lanthanide metal salt selected from the group consisting of
      (I) lanthanide metal salts of non-nitrogenous organic carboxylic acids having from 2 through 30 carbon atoms, and (II) lanthanide metal salts of non-nitrogenous alcohols having from 2 through 30 carbon atoms.

2. The composition of claim 1 wherein the polymer is a normally solid, substantially water-insoluble copolymer, the repeating units of which consist essentially of (I) —OCH$_2$— groups interspersed with (II) groups represented by the general formula

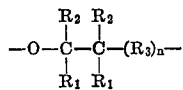

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive, each lower alkyl radical having from one to two carbon atoms, inclusive, said groups of (I) constituting from 85% to 99.9% of the recurring units, said groups of (II) being incorporated during the step of copolymerization to produce said copolymer by the opening up of the ring of a cyclic ether having adjacent carbon atoms by the breaking of an oxygen-to-carbon linkage.

3. The composition of claim 2 wherein the lanthanide metal is selected from the group of metals of atomic number 57 through 71.

4. An oxymethylene polymer composition comprising:
(A) an oxymethylene polymer containing at least 85 percent recurring oxymethylene units,
(B) an oxymethylene polymer phenolic antioxidant, and (C) from about 0.001 to 5 percent by weight, based on the weight of the polymer, of at least one lanthanide metal salt selected from the group consisting of
(I) lanthanide metal salts of non-nitrogenous organic carboxylic acids having from 2 through 30 carbon atoms, and
(II) lanthanide metal salts of non-nitrogenous alcohols having from 2 through 30 carbon atoms.

5. The composition of claim 4, wherein said lanthanide metal salt is present in an amount in the range of from about 0.01 to 3 percent by weight and the lanthanide metal salt is a salt of an ethylenically unsaturated, aliphatic, hydroxy-substituted monocarboxylic acid having 2 to about 30 carbon atoms.

6. The composition of claim 4, wherein the lanthanide metal salt is present in an amount of 0.1 up to about 1.5 percent by weight and the lanthanide metal salt is a lanthanide ricinoleate.

7. The composition of claim 6, wherein the lanthanide metal salt is cerium ricinoleate.

References Cited

UNITED STATES PATENTS 3,240,753 3/1966 Dolce.
3,236,929 2/1966 Jupa et al.
3,189,630 2/1965 Smutny _____ 260—45.7 X

FOREIGN PATENTS 1,098,713 2/1961 Germany.

DONALD E. CZAJA, Primary Examiner

C. WARREN IVY, Assistant Examiner

U.S. Cl. X.R.

260—45.75, 45.95, 67